United States Patent [19]
Robitschek et al.

[11] 3,968,294
[45] July 6, 1976

[54] LIGNOCELLULOSIC PARTICLE BOARD CURED WITH ALKALI- AND ACID-CATALYZED PHENOL ALDEHYDE THERMOSETTING RESINS

[75] Inventors: Paul Robitschek; Ross L. Christensen, both of Eugene, Oreg.

[73] Assignee: Chembond Corporation, Springfield, Oreg.

[22] Filed: Apr. 3, 1974

[21] Appl. No.: 457,438

[52] U.S. Cl. ............................. 428/213; 428/304; 428/323; 428/525; 428/529; 156/335; 162/13
[51] Int. Cl.$^2$ .................. B32B 7/02; B32B 21/08
[58] Field of Search .......... 161/161, 162, 267, 262; 428/304, 323, 528, 529, 213, 326, 525; 156/335

[56] References Cited
UNITED STATES PATENTS

| | | | |
|---|---|---|---|
| 2,502,498 | 4/1950 | Williamson et al. | 260/38 X |
| 2,831,794 | 4/1958 | Elmendorf | 154/132 |
| 3,308,013 | 3/1967 | Bryant | 162/103 |
| 3,554,941 | 1/1971 | Varnell | 260/9 |
| 3,649,424 | 3/1972 | Rhiando | 161/43 |
| 3,668,286 | 6/1972 | Brooks et al. | 264/26 |
| 3,769,143 | 10/1973 | Kulesza | 161/156 |

*Primary Examiner*—William J. Van Balen
*Assistant Examiner*—Patricia C. Ives
*Attorney, Agent, or Firm*—Eugene D. Farley

[57] ABSTRACT

A fast cured lignocellulosic particle board comprises a hot consolidated laminar mat of lignocellulosic particles. The mat has a middle lamina of particles coated with a fast setting, acid catalyzed, phenol aldehyde thermosetting resin, while the two surface laminae comprise particles coated with a relatively slow curing, alkali catalyzed phenol aldehyde thermosetting resin. The middle lamina is fast curing, but potentially adherent to the metal cauls of the hot press in which the board is manufactured. Although the surface laminae are slower curing, they are nonadherent to the cauls. The net result is a non-sticking particle board curable in the press in about one-half the press time conventionally required.

6 Claims, No Drawings

LIGNOCELLULOSIC PARTICLE BOARD CURED WITH ALKALI- AND ACID-CATALYZED PHENOL ALDEHYDE THERMOSETTING RESINS

This invention relates to lignocellulosic particle boards. It pertains particularly to lignocellulosic particle boards made from mats comprising lignocellulosic particles and fast curing thermosetting resins.

A wide variety of lignocellulose composition boards is known to commerce. Such boards are termed generically herein "particle boards." They are manufactured from various lignocellulosic materials such as bagasse, straw and other waste vegetable materials, but in particular from wood. The wood is used in the form of fiber, ground wood, chips, shavings, flakes and comminuted particles.

In the manufacture of the board, the lignocellulose particles are coated with the predetermined amount of a selected adhesive, usually a thermosetting resinous adhesive. The adhesive coated particles then are formed into a mat which is pressed to the desired thickness and density. This forms the final particle board product.

The phenol aldehyde adhesives, particularly the thermosetting resinous condensation products of phenol and formaldehyde, are of primary importance in particle board manufacture. When used as adhesives, they impart to the finished board the desired properties of strength and water resistance. Also, as such materials go, they are competitive in cost, easily and effectively applied to the lignocellulose particles, and readily available from commercial sources.

The phenol aldehyde resinous adhesives useful for the intended purpose fall into two broad classes. One has a pH of less than about 2 and is acid-catalyzed. The other has a pH of from 7 to 13 and is alkali-catalyzed.

The resinous adhesives of the first class, i.e., the acid-catalyzed adhesives, set or cure very rapidly under the influence of heat and pressure. This is a desirable property since it materially cuts down the time required in the hot press during the manufacture of the particle board, and accordingly increases production and lowers cost. However, offsetting this advantageous property of fast curing, the acid catalyzed phenol aldehyde resinous adhesives have the fatal disadvantage, at least insofar as particle board manufacture is concerned, of sticking to hot metal surfaces. Accordingly, when used on the exposed surfaces of lignocellulosic mats or felts to be introduced between the platens of a hot press in the manufacture of particle board, they stick to the cauls and ruin the surfaces of the consolidated particle boards.

The alkali catalyzed phenol aldehyde resins, on the other hand, cure at a relatively slow rate, i.e., at a rate of less than half that of their acid catalyzed counterparts. However, they do not stick to hot metal surfaces and consequently are widely used in the large scale production of exterior grade lignocellulosic particle board.

It accordingly is the general object of the present invention to provide a lignocellulosic particle board, and the method of making the same, which takes advantage of the fast curing properties of the acid catalyzed phenol aldehyde resinous adhesives, but without incurring the disadvantages accruing from the property of such adhesives of sticking to hot metal surfaces.

Further objects of the present invention are the provision of a fast-cured lignocellulosic particle board and method of making the same, the application of which results in markedly decreased press time, correspondingly increased mill production rates, and decreased product cost while still producing a product which meets commercial standards for strength, water resistance, and other physical properties.

In its broad aspect, the presently described fast cured lignocellulosic particle board comprises a laminar mat of lignocellulosic particles admixed with thermosetting resin binder. The mat has a middle or core lamina comprising lignocellulosic particles coated with from 3 to 15% by weight, dry solids basis, of a fast setting acid catalyzed resinous condensation product of a phenol and an aldehyde having a pH of less than 2.

The surface laminae of the mat comprise lignocellulosic particles coated with from 3 to 15% by weight, dry solids basis, of a relatively slow setting alkali catalyzed phenol aldehyde thermosetting resin having a pH of from 7 to 13. Each surface lamina has a thickness adequate to serve as a barrier lamina preventing contact between the middle lamina and the platens of the press.

The core lamina containing the acid catalyzed thermosetting resin is characterized by the property of setting or curing with extreme rapidity. It accordingly requires a low press time. However, as noted, it has the disadvantageous property of sticking to the metal caul plates of the hot press used in the manufacture of the particle board.

The alkali catalyzed resins of the surface lamina do not stick to hot metal surfaces. They cure comparatively slowly, but their slow curing tendency is offset in significant degree by the fact that they are present on the mat surfaces immediately adjacent the hot metal cauls where heat transfer is most effective. Also, they are relatively thin so that they are heated rapidly to curing temperature. These two factors overcome the slow curing tendency of the alkali catalyzed resins in the surface laminae and insure that the surface laminae will cure substantially as rapidly as the middle lamina. As a result, the overall press time required to consolidate the mat to predetermined thickness and density, and to cure the thermosetting resin binder, is sharply reduced.

Considering the foregoing in greater detail:

The lignocellulose particles which are the basic raw material for use in the manufacture of the herein described fast cured lignocellulosic particle board may be derived from a large number of natural sources. They may be derived, for example, from sugar cane bagasse, straw, cornstalks, and other waste vegetable matter. In particular, however, they may be derived from various species of wood in the form of wood fibers, chips, shavings, flakes or particles produced in known manner by known wood reducing apparatus. The wood particles may be employed with or without preliminary chemical or mechanical treatment such as is described, for example, in U.S. Pat. No. 3,668,286.

The fast setting, acid catalyzed resinous condensation product of a phenol and an aldehyde employed for coating the lignocellulosic particles of the middle lamina of the mat is manufactured in known manner by the condensation of a phenol and an aldehyde. Illustrative of representative phenols which may be employed for this purpose are the cresols, the xylenols, the lignosulfonic acids, resorcinol and, in particular, phenol itself.

Representative of suitable aldehydes for use in condensation with the phenol are acetaldehyde, furfural, glyoxal, and in particular, formaldehyde.

The phenol and aldehyde are reacted with each other in molar ratios of between 1:1 and 1:3 in aqueous media and in the presence of a strong base such as caustic soda, caustic potash, calcium hydroxide or barium hydroxide. The condensation is carried out at a temperature of from between room temperature and 100°C., preferably between 50° and 80°C. At the conclusion of the condensation reaction, the reaction mixture is neutralized to the desired pH of 4 to 7 with strongly ionized acids including sulfuric acid, phosphoric acid and, particularly, hydrochloric acid.

The resulting partly polymerized resin is water dilutable in at least equal parts with water, but preferably in two or more parts of water, and has a Gardner-Holt viscosity of $A_4$ to C in 53% solids concentration. It has a free formaldehyde level of below 6%, which corresponds to a reaction completion of at least 75%. It is stable at room temperature in terms of retaining minimum water dilutability for at least 24 hours, but preferably one week or more.

The resinous condensation product is soluble in water, but also in acetone, methanol and other water soluble alcohols. It has a resin concentration (solids percent in mixture) of between 20 and 80%, preferably 40% and 60%, by weight. In the presence of an acid catalyst, the resin remains in solution below a pH of 3, preferably below a pH of 2. It cures completely and rapidly, i.e., in a few minutes, in the presence of strong inorganic or organic acid catalysts.

Suitable catalysts are those which are soluble in the resin and preferably have an ionization constant of greater than $10^{-2}$. They include the mineral acids such as hydrochloric acid, sulfuric acid, and phosphoric acid. Various of the stronger organic acids also are useful catalysts, including sulfamic acid, maleic acid, and the sulfonic acids, in particular paratoluene sulfonic acid.

In acid medium, these various acid catalysts rapidly set the above described acid-catalyzed resinous adhesives which accordingly are useful in compositing the middle lamina of the herein described fast cured lignocellulosic particle board products.

The alkali catalyzed thermosetting resin binder used in the slower setting but non-sticking surface laminae of the board comprises the resinous condensation product of a phenol and an aldehyde, used in conjunction with an alkali catalyst and having a pH in the range of from 7 to 13.

It employs as its phenolic constituent the cresols, the xylenols, the lignosulfonic acids, resorcinol and phenol itself. Of this group, resorcinol is a preferred member because of the rapid curing properties of resorcinol-aldehyde resins even in neutral or mildly alkaline medium. It employs as its aldehyde component acetaldehyde, furfural, glyoxal and in particular, formaldehyde.

The alkali catalyzed resins are manufactured in aqueous media using a molar ratio of phenol to aldehyde of between 1:1 and 1:3, in the presence of a strong base, which preferably is caustic soda, but also may comprise caustic potash, calcium hydroxide or barium hydroxide. The caustic proportion, based on total reactant weight, is 2 to 10%, preferably from 3 to 8%.

The polymerization reaction is carried out at a temperature varying between room temperature and 100°C., preferably between 70° and 93°C. to accelerate polymerization. The resulting product has a resin concentration, solids percent in mixture, of between 20 and 80%, preferably 40 to 60% by weight. The resin is soluble in aqueous alkaline medium, but also in such solvents as acetone, methanol and other water soluble alcohols. The product has a Gardner-Holt viscosity in the range of G to X in the solids range of 40–60% by weight; a water dilutability of at least in equal parts water, but preferably in two or more parts water; and a room temperature storage stability of at least two days.

In the case of both the acid catalyzed and the alkali catalyzed thermosetting resinous adhesives, suitable additives may be mixed in to contribute desired properties. Thus from 0.25–3% by weight, based on the weight of the oven dry wood in the board product, of paraffin wax added as an aqueous emulsion, may be included. Still further, from 5 to 20% by weight, based on the weight of the oven dry wood in the board product, of a suitable plasticizer may be included. Suitable plasticizers include glycol esters, glycerine esters, phosphate esters and the like. Thickeners such as the various gums, starches and protein materials still further may be included.

In the manufacture of the finished particle board product of the invention the wood or other lignocellulosic material first is reduced to the form of particles of the desired size and shape. As noted above, the particles preferably comprise wood fibers, granules, chips, shavings, or flakes.

The particles are admixed with, or coated with, the selected thermosetting resinous adhesive, used in amount of from about 3 to 15% by weight, dry solids basis. The resinous adhesive is applied to the particles in a desired manner, for example, by tumbling the particles in a rotating drum while spraying them with a metered flow of liquid adhesive.

Two portions of resinous adhesive coated particles are prepared. The one, used for the body of the particle board, i.e., the middle lamina, is prepared by coating the particles with fast setting acid catalyzed resinous adhesive. The other, used for the surface laminae of the board, is prepared by coating the particles with a slower setting, but non-sticking, alkali catalyzed thermosetting resin.

The above two furnishes are felted into a laminar mat product. This may be accomplished variously, using conventional techniques and apparatus.

In one suitable technique, a conveyor carries a plurality of metal caul plates past a felting station. At the felting station, there are positioned three felting heads. These may be of the winnowing type, sifting type, rotating perforated drum type, or wig-wag spout type.

The first felting head deposits on the caul plates passing beneath it on the conveyor a surface layer of the desired thickness of the furnish comprising wood particles and the relatively slow curing, but non-sticking alkali catalyzed resinous adhesive. The second felting head deposits on the first lamina a central lamina of the second furnish comprising wood particles coated with the rapid setting acid catalyzed phenol aldehyde resinous adhesive. The third felting head deposits on the composite mat a top surface lamina of the first furnish comprising wood particles coated with the relatively slow setting, but non-sticking alkali catalyzed resinous adhesive.

The desired amounts of wax emulsions, plasticizers and other additives may be similarly applied to the particles, either admixed with the liquid resinous adhesive, or as separately applied sprays.

The relative thicknesses of the surface and core mat laminae are varied as required to achieve desired properties in the finished board. In general, however, the surface mat laminae should be sufficiently thick to form a barrier between the platens of the hot press into which the composite mat is to be introduced, on the one hand, and the middle or core layer of the mat on the other hand. As noted, the middle layer has platen-sticking qualities. In theory, the surface mat laminae need be only one particle thick to form a screen or mask. In practice, however, in the unconsolidated composite mat they should have a minimum thickness of at least 0.025 inch in order to provide an effective barrier during pressing.

The upper limit of thickness of the mat surface laminae depends upon the properties desired in the final board. To achieve the purposes of the invention, i.e., a rapid cure in the press without sticking of the press charge to the press platens, and without sacrifice of product qualities, the surface laminae should be maintained as thin as possible. In general each mat surface lamina should have a thickness which does not exceed about 30% of the total thickness of the mat and hence of the board product, where as usually is the case, the thickness of the unconsolidated mat is at least one-half inch.

It should be noted that although the surface and core mat laminae are in direct contact with each other at their interfaces, and although the one is basic in pH and the other acidic, there is but a minor and non-detrimental degree of reaction occurring between the alkaline components of the one and the acid components of the other. This is for the reason that the laminated felt or mat is of very low density and is comprised of about 80% voids. Also, when the resinous adhesive mixture is sprayed on the lignocellulosic particles, it incompletely coats the surfaces of the particles so that a large proportion, perhaps a major proportion, of the particle surfaces is not coated with the adhesive. As a result of these two factors, there is very little direct contact between the acidic adhesive of the core lamina and the basic adhesive of the surface laminae and interaction between the two accordingly is minimal and not a problem.

On subsequent exposure of the finished board to aging conditions, the alkali and acid present in the respective laminae will interact over a period of time. This results in substantial neutralization of the acid components, which are present in the lesser proportion, thus preventing wood degradation which otherwise would occur in the presence of strong acids. This is evidenced by the excellent performance of such boards under accelerated aging conditions.

After the continuous laminar mat leaves the felter, it is cut into segments corresponding in length to the underlying caul plates. The caul plates with their overlying burden of laminar mat then are transferred to a conventional multi-opening hot press and consolidated to the desired thickness and density. The press conditions are determined by such factors as the identity of the thermosetting resinous adhesives employed, the relative proportions of the two classes of such adhesives employed, the thickness of the mat and the density of the product. In general, however, the expedient of employing a rapid setting phenolic adhesive in the core lamina cuts the press time about in half.

The fast cured lignocellulosic particle boards of the invention and the methods of their preparation are illustrated in the following examples, wherein parts are given in parts by weight.

EXAMPLE 1

This example illustrates the preparation of a fast setting acid catalyzed phenol formaldehyde resinous adhesive useful as the rapid setting adhesive employed in the middle or core lamina of the herein described particle board:

2096 Parts of 50% aqueous formaldehyde at about 50°C. was mixed with 1,824 parts of 90% phenol and 80 parts of 50% sodium hydroxide with gentle stirring and cooling to hold the temperature below 60°C. The reaction was continued at 60° for about 5 hours at the end of which time the mixture had a free formaldehyde content of 4%.

The reaction mixture then was cooled to 30°C. and 200 parts methanol and 96 parts concentrated hydrochloric acid were added. The resulting product had a pH of 6.8, a solids concentration of 53%, a Gardner-Holt viscosity of $A_3A_2$ and a water dilutability of 8 parts water to 1 part reaction product. After 10 days, the water dilutability had dropped to 2.5 parts. The product was usable for more than 2 weeks, stored at room temperature.

EXAMPLE 2

This sample illustrates the preparation of another rapid curing acid catalyzed phenol formaldehyde resin useful for the purposes of the invention.

301 Parts of 50% formaldehyde at about 50°C. was mixed with 175 parts of 90% phenol and 24 parts of 50% caustic soda with gentle stirring and cooling to hold the temperature below 50°C. The reaction mixture was held at or below 50°C until its free formaldehyde content was down to 6%. It was then cooled to room temperature and 87 parts of 90% phenol added. This made a formaldehyde to phenol molar ratio of 2:1.

30 Parts of concentrated hydrochloric acid was added to neutralize the sodium hydroxide. The resulting reaction product had a pH of 4.0, a solids concentration of 52.8%, a Gardner-Holt viscosity of $A_3$, and infinite water dilutability. After 11 days the water dilutability dropped to 5 parts water to 1 part reaction product.

EXAMPLE 3

In a manner similar to the foregoing, there are prepared rapid setting phenol aldehyde resinous adhesives using in place of the phenol component of the reaction mixture, resorcinol, cresol, xylenol, and lignosulfonic acid; and using also in place of the formaldehyde component of the reaction mixture acetaldehyde, furfural, and glyoxal.

EXAMPLE 4

This example illustrates a method of preparation of a comparatively slow curing alkali catalyzed thermosetting resinous adhesive useful in the preparation of the surface laminae of the herein described particle board product.

1131 Parts of 90% phenol, 1461 parts of 50% formaldehyde and 909 parts of water were mixed together with gentle stirring while maintaining the temperature between 25° and 30°C. 499 Parts of 50% sodium hydroxide were added with cooling to maintain the temperature below 85°C.

After the addition of the sodium hydroxide, the temperature was allowed to rise to 90°C. and the resin reacted to a Gardner-Holt viscosity of T. The reaction was cooled to ambient temperature, whereupon the resinous product contained 43.5% non-volatiles and a sodium hydroxide content of 6.7% by weight. Its pH was 12.5.

EXAMPLE 5

In a manner similar to that set forth in Example 4, there are prepared for use in the surface laminae of the herein described lignocellulosic particle board, alkali catalyzed thermosetting resins using resorcinol in place of the phenol of Example 4; and using acetaldehyde, furfural or glyoxal in place of the formaldehyde of Example 4.

EXAMPLE 6

This example illustrates the manufacture of a fast-cured lignocellulosic particle board by the process of the present invention, using the compositions of Examples 1–5.

Two batches of thermosetting resin adhesive-coated fibers were prepared. One was prepared by coating the fibers with the acid catalyzed resin of Example 1. In the preparation of the resin for the coating operation, 4% by weight of solid paratoluene sulfonic acid, based on the total weight of the reaction product, was added to the resin. The resulting resinous solution had a pH of less than 1.0, a boiling water gel time of less than 2 minutes, and a pot life of less than 30 minutes.

The second batch was prepared by coating the wood fibers with the alkali cured resinous adhesive of Example 4.

In both cases, the wood fiber furnishes were prepared by spraying the wood fibers with the solution of resinous adhesive while tumbling the fibers in a drum. The solutions were applied in amount sufficient to distribute about 7% by weight solids on the wood fibers.

Laminar mats were prepared from the two furnishes. The mats were approximately 2 inches thick. Each surface layer was 0.2 inch thick. The central or core lamina comprised the wood fibers coated with the acid catalyzed resinous adhesives; the surface laminae, the fibers coated with the alkali catalyzed resin. As controls, homogeneous mats composed of a single layer of the fibers coated with the acid catalyzed resin and a single layer of the fibers coated with the alkali catalyzed resin were formulated.

The mats were consolidated into boards in a hot press at 320°F. and 500 p.s.i.g. for 4 minutes. Particle board panels of ⅝ inch thickness and 45 pounds per cubic foot density resulted.

In the case of the control board consisting of a single lamina including the acid catalyzed phenol aldehyde resinous adhesive, severe sticking of the mat to both the press and the caul plate occurred. This phenomenon was severe enough to destroy the usefulness of the product.

However, in the case of the laminar board having a central core lamina containing the fast setting acid catalyzed resin and surface laminae comprising a screening layer of wood fibers coated with the alkali catalyzed resinous adhesive, no sticking was observed. In addition, the board product met commercial standards for internal bonding, modulus of rupture, steam swelling, water absorption; and thickness swelling when tested by standard test methods for these properties.

In the case of the control board consisting of a single lamina including the alkali catalyzed resinous adhesive, no sticking occurred but a press time was required of about 9½ minutes, or more than double the press time required for consolidating and curing the mats of the invention including a central lamina comprising wood particles coated with fast setting acid catalyzed resinous adhesives.

EXAMPLE 7

The procedure of Example 6 was repeated, using several variants.

In one, the procedure was repeated employing separately as the acid catalyst for the acid catalyzed resin: trichloroacetic acid, sulfamic acid, and phosphoric acid, each added in amount sufficient to produce a resinous adhesive having a pH of less than 1. In each case, a board product of satisfactory properties was produced in a press time of about 4 minutes without sticking of the board product to the press or to the caul plate.

EXAMPLE 8

Another series of experiments was run using separately in the procedure of Example 6 a resorcinol formaldehyde alkali catalyzed resin employed in the furnishes comprising the surface laminae. This, too proved satisfactory in preventing sticking of the mat to the press and caul plate. It produced a board product meeting commercial standards in a press time of about 4 minutes.

Having thus described our invention in preferred embodiments, we claim:

1. For use in the manufacture of hot pressed lignocellulosic particle board, a consolidatable laminar mat comprising:
   a. a middle lamina comprising lignocellulose particles coated with from 3 to 15% by weight, dry solids basis, of a fast setting, acid catalyzed phenol aldehyde thermosetting resin having a pH of less than 2, and
   b. surface laminae comprising lignocellulose particles coated with from 3 to 15% by weight, dry solids basis, of an alkali catalyzed phenol aldehyde thermosetting resin and having a pH of 7 to 13,
   c. each surface lamina having a thickness of at least 0.025 inch.

2. A fast cured, hot pressed lignocellulosic particle board comprising:
   a. a laminar mat of lignocellulose particles admixed with thermoset resin binder and comprising middle and surface laminae,
   b. the middle lamina comprising lignocellulose particles coated with from 3 to 15% by weight, dry solids basis, of a fast setting, acid catalyzed phenol aldehyde thermoset resin having a pH of less than 2,
   c. the surface laminae comprising lignocellulose particles coated with from 3 to 15% by weight, dry solids basis, of an alkali catalyzed phenol aldehyde thermoset resin having a pH of from 7 to 13,
   d. the surface laminae having thicknesses determined by surface laminae thicknesses in the unconsolidated mat of at least 0.025 inch,
   e. the laminar mat having been consolidated to a predetermined density and thickness by the application of heat and pressure.

3. The particle board of claim 2 wherein the fast setting, acid catalyzed phenol aldehyde thermosetting resin comprises a phenol formaldehyde resin.

4. The particle board of claim 2 wherein the fast setting, acid catalyzed phenol aldehyde thermosetting resin comprises a phenol formaldehyde resin catalyzed with paratoluene sulphonic acid.

5. The particle board of claim 2 wherein each surface lamina has a thickness determined by a surface lamina thickness in the unconsolidated mat of at least 0.025 inch but not over 30% of the total mat thickness.

6. The particle board of claim 2 wherein the lignocellulose particles of the laminar mat comprise wood particles.

* * * * *